(12) United States Patent
Mockenhaupt et al.

(10) Patent No.: US 7,328,685 B2
(45) Date of Patent: Feb. 12, 2008

(54) SLIP JOINT EXHAUST MANIFOLDS

(75) Inventors: Martin Mockenhaupt, Buffalo Grove, IL (US); Lance Heiser, Naperville, IL (US); Joseph Ulrich, Lisle, IL (US)

(73) Assignee: Dana Corporation, Toledo, OH (US)

( * ) Notice: Subject to any disclaimer, the term of this patent is extended or adjusted under 35 U.S.C. 154(b) by 162 days.

(21) Appl. No.: 11/142,630

(22) Filed: Jun. 1, 2005

(65) Prior Publication Data

US 2006/0272321 A1    Dec. 7, 2006

(51) Int. Cl.
*F01N 7/10*    (2006.01)
*F16J 15/06*    (2006.01)

(52) U.S. Cl. .................. 123/315; 60/323; 277/627

(58) Field of Classification Search ................. 123/315, 123/65 EM; 60/323; 277/627
See application file for complete search history.

(56) References Cited

U.S. PATENT DOCUMENTS

| | | | |
|---|---|---|---|
| 1,838,496 A | 12/1931 | Oven | |
| 3,285,632 A | 11/1966 | Dunkle | |
| 3,831,954 A | 8/1974 | Longfellow | |
| 4,218,067 A | 8/1980 | Halling | |
| 4,831,824 A * | 5/1989 | Fukazawa | ............. 60/322 |
| 5,407,214 A | 4/1995 | Lew et al. | |
| 5,531,454 A | 7/1996 | Borneby | |
| 5,622,372 A | 4/1997 | Fujisawa et al. | |
| 6,016,775 A * | 1/2000 | Kennedy | ............. 123/54.4 |
| 6,328,310 B1 | 12/2001 | Chikaraishi | |
| 6,409,175 B1 | 6/2002 | Evans et al. | |
| 6,517,086 B1 | 2/2003 | Jamrog | |

FOREIGN PATENT DOCUMENTS

JP    08200058 A  *  8/1996

* cited by examiner

*Primary Examiner*—Stephen K. Cronin
*Assistant Examiner*—Hyder Ali
(74) *Attorney, Agent, or Firm*—Marshall & Melhorn LLC

(57) ABSTRACT

A multi-piece exhaust manifold includes a ring seal between separate portions. The separate portions have generally cylindrical sealing surfaces formed thereon to mate with the ring seal. The ring seal may include a metal sheath filled with graphite or other sealing material.

17 Claims, 4 Drawing Sheets

SLIP JOINT EXHAUST MANIFOLDS

TECHNICAL FIELD

The present invention relates to gaskets for interconnecting components that may experience relative movement and in particular to gaskets for interconnecting multi-piece exhaust manifolds.

BACKGROUND

In multi-cylinder internal combustion engines, exhaust manifolds are typically in fluid communication with exhaust ports. In a typical in-line 6 cylinder engine, the exhaust manifold includes 6 ports connected to the exhaust ports and one exit passage connected to a turbo charger or exhaust pipe. For larger engines, the exhaust manifold may need to be greater than three feet in length. The heat differential and resulting thermal expansion experienced by a longer exhaust manifold generally prohibits a single piece manifold as the internal stresses and resulting stresses placed on the cylinder head connections exceed desired levels.

In a turbocharged application, generally the exhaust gasses are desirably routed from the cylinder head exhaust ports to the intake of the turbine with minimal loss of power. This requires that the exhaust gasses reach the turbine by following the shortest path. Multi-piece manifolds, therefore, have been developed for larger engines to route exhaust gasses to a turbocharger turbine, while allowing for thermal expansion of the exhaust manifold. Typically, a multi-piece exhaust manifold includes one or more connections that allow for relative movement of the connecting portions of the exhaust manifold sub-assembly portions.

In order to adequately seal between the exhaust manifold sub-assembly portions, the end connections are typically annular in form with one end of one sub-assembly interposed within another end of another sub-assembly, and the axis of each end generally aligned with the length of the exhaust manifold such that thermal expansion of the exhaust manifold sub-assemblies will result in relative axial movement between the ends. A ring seal can then be disposed between the ends to provide a seal that allows for the relative axial movement.

For lower heat applications, many polymers may be used to seal between the ends of the multi-piece exhaust manifold. With the advent of engines with higher operational temperatures to increase efficiency, polymers have been found to be undesirable and unable to provide the required sealing properties and material properties. Indeed polymers have been found to degrade with increase in temperature.

Referring to FIG. 1, a partial view of a prior art manifold 20 is illustrated. Manifold 20 includes a first portion 22 and a second portion 24. First portion 22 includes a generally hollow body 30 defining an annular connection end 32. Annular end connection 32 is defined in part by a cylindrical sealing surface 36. Second portion 24 includes a generally hollow body 40 defining an annular connection end 42. Annular end connection 42 is defined in part by a cylindrical sealing surface 46 that may be separated into three grooves 48. Each groove 48 accommodates a split ring (not shown) which is similar to a piston ring. Typically, the split rings are made of precisely machined Inconel™ alloy to provide a tight fit between the split rings and cylindrical sealing surfaces 36, 38.

When installed, both first portion 22 and second portion 24 are connected to a cylinder head (not shown) and are in fluid communication with at least one exhaust port of the cylinder head. Importantly, first portion 22 and second portion 24 are not in contact, with the split rings sealing therebetween and allowing for relative axial movement.

An advantage of the Inconel™ alloy split ring is that the material retains its desired sealing properties at increased operating temperatures. However, the split ring connection does not provide a positive seal as exhaust gasses may escape between the splits in the split rings. Another disadvantage of the split ring connection is that both the Inconel™ and the required machining are relatively costly. What is needed, therefore, is a seal between ends of a multi-piece exhaust manifold that provides a positive seal while reducing associated costs.

SUMMARY OF THE INVENTION

An embodiment of the present invention provides an multi-piece manifold that includes a first portion having a first generally cylindrical sealing surface and a second portion having a second generally cylindrical sealing surface. The manifold also includes a metallic, continuous sealing ring interposed between the first generally cylindrical sealing surface and the second generally cylindrical sealing surface.

Another embodiment of the present invention provides a sealing system for providing a seal between at least two components. The sealing system includes a first component having a first generally cylindrical surface and a second component having a second generally cylindrical sealing surface. At least a portion of the first generally cylindrical surface and at least a portion of the second generally cylindrical surface are generally coaxial. A metallic, continuous sealing ring is interposed between the first generally cylindrical sealing surface and the second generally cylindrical sealing surface. The ring has a metal wrap at least partially enclosing a core.

BRIEF DESCRIPTION OF THE DRAWINGS

The present invention will now be described, by way of example, with reference to the accompanying drawings, in which.

DETAILED DESCRIPTION

Figure 1:
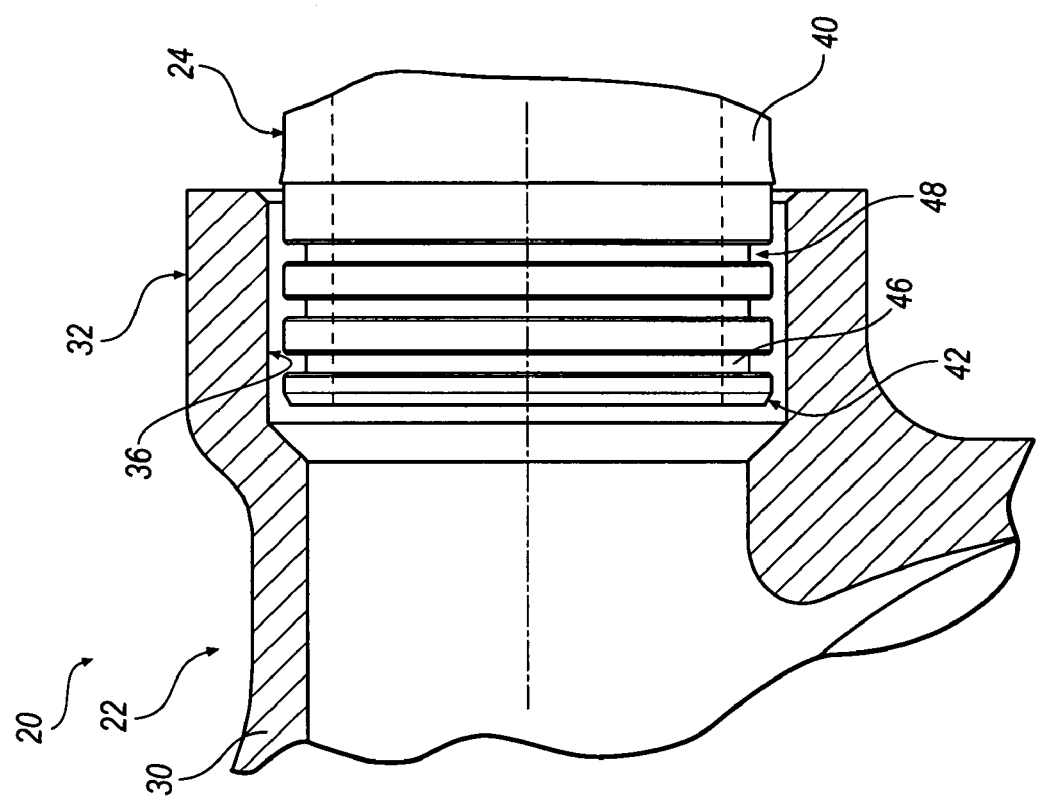
FIG. 1 is a partial sectional view of a prior art manifold.
Figure 2:
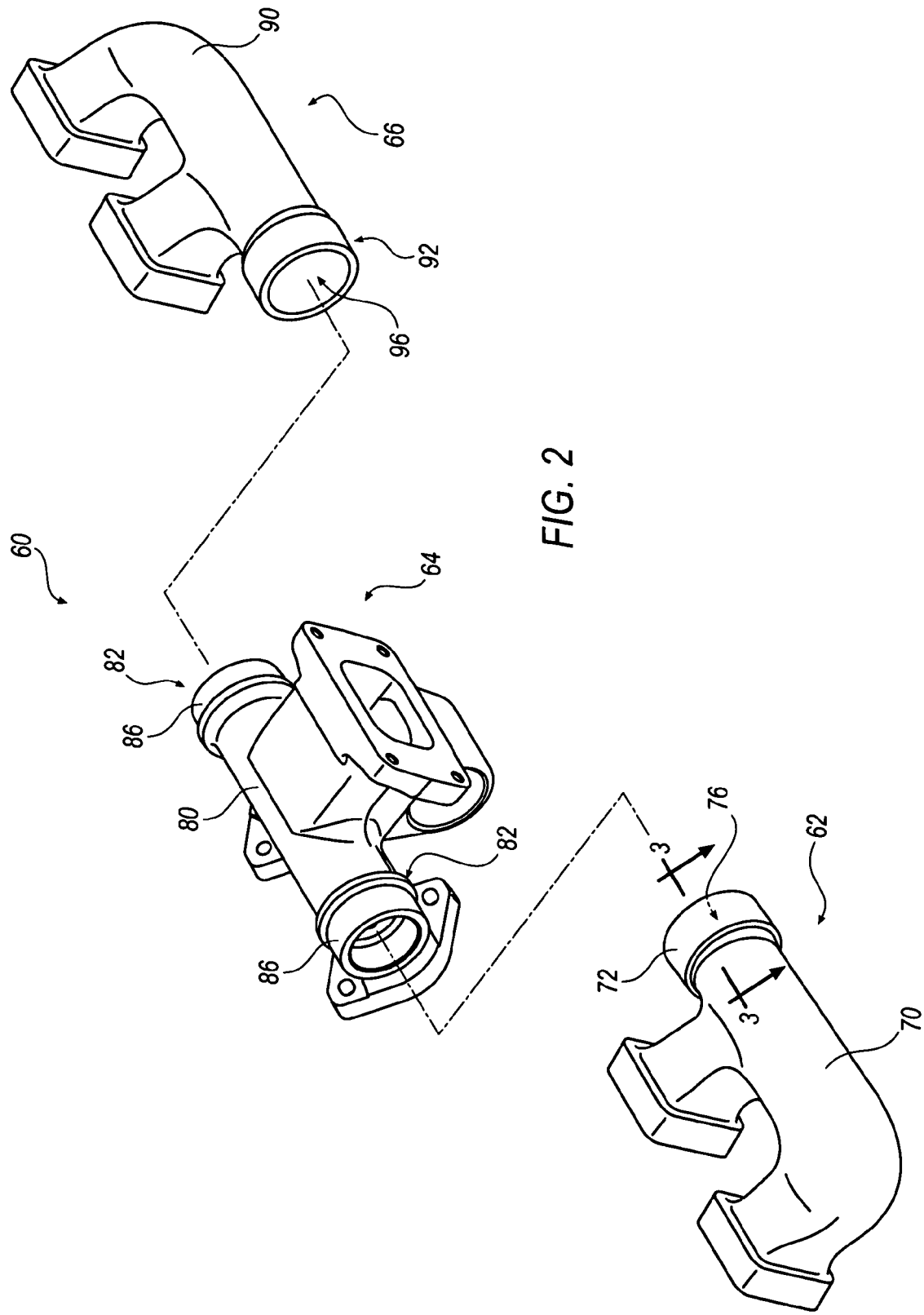
FIG. 2 is a partially exploded perspective view of a manifold in accordance with an embodiment of the present invention.
Figure 3:
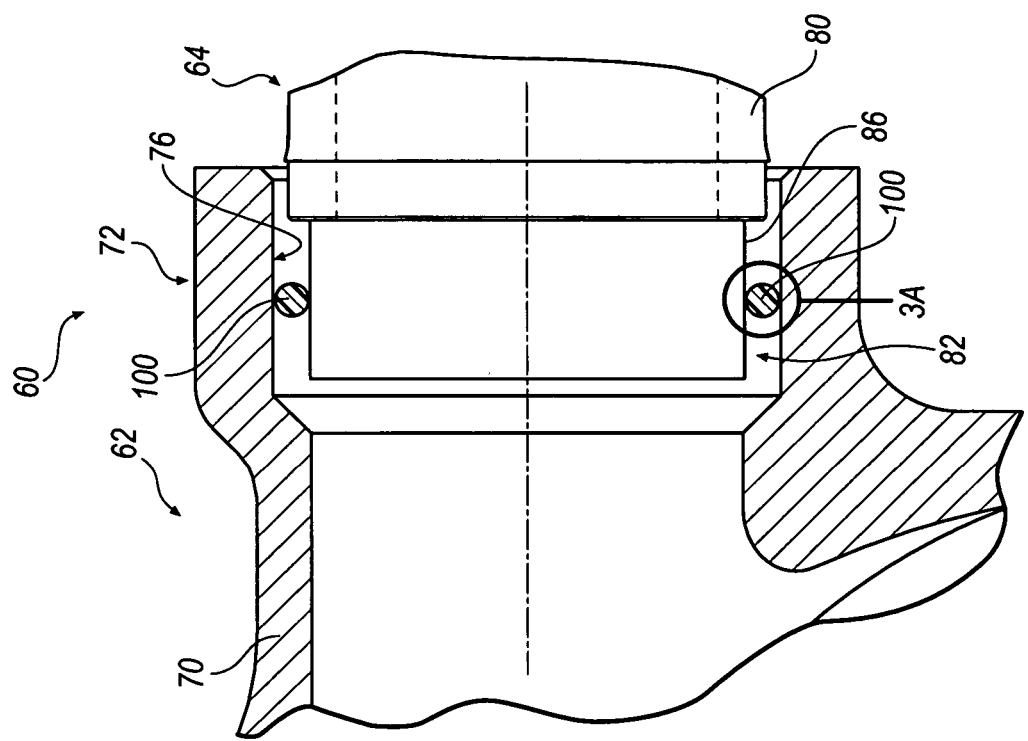
FIG. 3 is a partial sectional view of the manifold of FIG. 2, taken along line 3-3.

Referring to FIGS. 2 and 3, an embodiment of a multi-piece manifold 60 is illustrated. Manifold 60 includes a first portion 62, a second portion 64 and a third portion 66. First portion 62 includes a generally hollow body 70 defining a first annular connection end 72. First annular connection end 72 is defined in part by a first generally cylindrical sealing surface 76. Second portion 64 includes a generally hollow body 80 defining a pair of second annular connection ends 82. Each second annular connection end 82 is defined in part by a second generally cylindrical sealing surface 86. Third portion 66 includes a generally hollow body 90 defining a third annular connection end 92. Third annular connection end 92 is defined in part by a third generally cylindrical sealing surface 96.

Figure 3A:
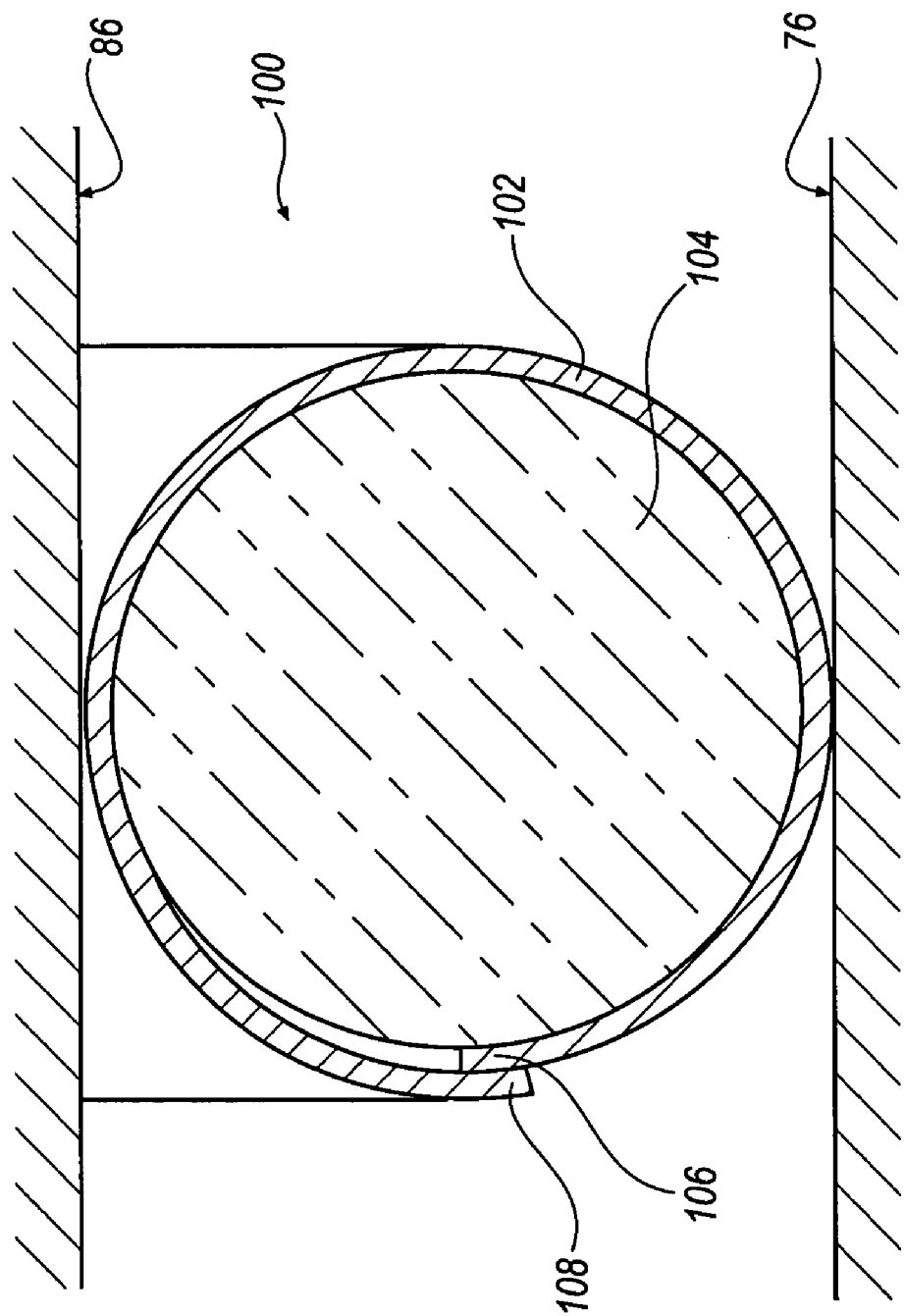
FIG. 3A is an enlarged view of region 3A of FIG. 3.

With specific reference to FIG. 3, a ring seal 100 is interposed between the first cylindrical sealing surface 76 and the second cylindrical sealing surface 86. As shown in FIG. 3A, ring seal 100 is preferably constructed of an outer metal wrap 102 with a heat resistant and resilient core 104. Outer metal wrap preferably includes a circular edge 106 and an overlapping edge 108. As illustrated, first portion 62 and second portion 64 are not in direct contact. Preferably, first portion 62 and second portion 64 never contact once secured to the cylinder head, since contact during thermal expansion, contraction or vibrations would result in undesirable induced stresses.

Ring seal 100 may be interposed between the first cylindrical sealing surface 76 and the second cylindrical sealing surface 86 in a press fit fashion where some force is used to assemble manifold 60. Preferably, outer metal wrap 102 is constructed of a conformable metal in order to form a metallic ring seal 100 that can bindingly seat on the cylindrical sealing surfaces 76, 86, 96.

To assemble the manifold 60, ring seal 100 is superposed on second sealing surfaces 86. First portion 62 may then be coupled to second portion 64 by interposing second end 82 into first end 72 as ring seal 100 contacts first sealing surface 76. Third portion 66 is coupled to second portion 64 in similar fashion.

In some applications, relative movement between the first annular connection end 72 and the second annular connection end 82 may be in excess of 3 mm of relative axial displacement due to thermal expansion. Thus, ring seal 100 may slide along at least one of the first cylindrical sealing surface 76 and the second cylindrical sealing surface 86 as the temperature of manifold 60 changes. Also, some amount of misalignment between the axes of the first cylindrical sealing surface 76 and the second cylindrical sealing surface 86 can be permitted as ring seal 100 provides a seal therebetween. Therefore, ring seal 100 seals the connection between the first annular end 72 and the second annular end 82 while accommodating relative movement. This sealing system allows the ring seal 100 to flex while maintaining a seal, while the prior art sealing systems that incorporate rigid split rings cannot flex to the same degree.

Similar ring seals are disclosed in commonly owned U.S. Pat. No. 6,517,086, the disclosure of which is hereby incorporated by reference in its entirety. The core 104 of ring seal 100 may be graphite, mica, mica based inorganic filler, metallic, or other materials that promote a seal. Preferably, the core 104 can withstand a temperature of 1500° F. without significant degradation of its resilient characteristics. An example of a favorable material for the core 104 is an expandable graphite, which includes unexpanded or un-exfoliated graphite flakes. Upon heating, the un-exfoliated graphite flakes may separate and expand to several times their original thickness, causing the ring seal 100 to expand and bias the wrap 102 against the first cylindrical sealing surface 76 and the second cylindrical sealing surface 86. Ring seal 100 is preferably somewhat deformable to allow a press fit onto second generally cylindrical sealing surface 86. Also preferable, outer metal wrap 102 is stamped from a sheet of metal stock into a torrid shape and deformed, or wrapped to contain core 104 to provide a ring seal 100 that is formed as a continuous ring with no gap or split.

While surfaces 76, 86, 96 are described and depicted herein as generally cylindrical and generally parallel, surfaces 76, 86, 96 may be slightly conical and/or deviate from a parallel orientation while ring seal 100 provides an adequate sealing pressure therebetween. While manifold 60 has been described as an exhaust manifold, other components may benefit from the sealing system described herein.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled. The disclosures of all articles and references, including patent applications and publications are incorporated herein by reference for all purposes.

What is claimed is:

1. A multi-piece exhaust manifold comprising:
   a portion having a hollow body with a larger outside diameter than a generally cylindrical end portion having a single outside radial surface;
   another portion having a generally cylindrical inside radial surface; and
   a metallic, continuous sealing ring interposed between said single outside radial surface and said inside radial surface.

2. The exhaust manifold of claim 1, wherein said sealing ring is circumscribed within said generally cylindrical inside radial surface.

3. The exhaust manifold of claim 1, wherein said sealing ring circumscribes at least a portion of said generally cylindrical outside radial surface.

4. The exhaust manifold of claim 1, wherein said metallic ring includes a core, and said core includes a non-metallic material.

5. The exhaust manifold of claim 4, wherein said core comprises a graphite.

6. The exhaust manifold of claim 4, wherein said core comprises a mica based inorganic filler.

7. The exhaust manifold of claim 1, wherein said core selectively expands when heated.

8. The exhaust manifold of claim 1, wherein said portion does not contact said other portion during operation of the manifold.

9. The exhaust manifold of claim 1, wherein said sealing ring is constructed, at least in part, of a softer material than said portion.

10. The exhaust manifold of claim 1, wherein said sealing ring includes an outer wrap, and said outer wrap has an overlapping edge.

11. A sealing system for providing a seal between at least two components comprising:
    a first component having a hollow body with a larger outside diameter than a generally cylindrical end portion having a single outside radial surface;
    a second component having a generally cylindrical inside radial surface, wherein at least a portion of said generally cylindrical outside radial surface and at least a portion of said generally cylindrical inside radial surface are generally coaxial; and
    a metallic, continuous sealing ring interposed between said single outside radial surface and said inside radial surface having a metal wrap at least partially enclosing a core.

12. The sealing system of claim 11, wherein said core comprises a graphite.

13. The sealing system of claim 11, wherein said core comprises a mica based inorganic filler.

14. The sealing system of claim 11, wherein said core selectively expands when heated.

15. The sealing system of claim 11, wherein said first component does not contact said second component during operation of said sealing system.

16. The sealing system of claim 11, wherein said sealing ring is constructed, at least in part, of a softer material than said first component.

17. The sealing system of claim 11, wherein said sealing ring includes an outer wrap, and said outer wrap has an overlapping edge.

\* \* \* \* \*